(12) United States Patent
Motohashi

(10) Patent No.: US 7,258,935 B2
(45) Date of Patent: Aug. 21, 2007

(54) MAGNETIC RECORDING MEDIUM

(75) Inventor: Kazunari Motohashi, Miyagi (JP)

(73) Assignee: Sony Corporation, Tokyo (JP)

( * ) Notice: Subject to any disclaimer, the term of this patent is extended or adjusted under 35 U.S.C. 154(b) by 554 days.

(21) Appl. No.: 10/824,864

(22) Filed: Apr. 15, 2004

(65) Prior Publication Data

US 2004/0214044 A1    Oct. 28, 2004

(30) Foreign Application Priority Data

Apr. 23, 2003  (JP)  ............................ P2003-118535

(51) Int. Cl.
  *G11B 5/66*  (2006.01)
  *G11B 5/70*  (2006.01)
(52) U.S. Cl. ...................................... 428/836
(58) Field of Classification Search ............ 428/836.1, 428/836.2, 836.3, 836
  See application file for complete search history.

(56) References Cited

U.S. PATENT DOCUMENTS 7,094,483 B2 *  8/2006  Pelhos et al. ............... 428/832

FOREIGN PATENT DOCUMENTS

| JP | 59-198526 | 11/1984 |
| JP | 01-125714 | 5/1989 |
| JP | 2000-339605 | 12/2000 |
| JP | 2001-143236 | 5/2001 |

OTHER PUBLICATIONS

Japanese Office Action Issued on Oct. 17, 2006.

* cited by examiner

*Primary Examiner*—Holly Rickman
(74) *Attorney, Agent, or Firm*—Sonnenschein Nath & Rosenthal LLP

(57) ABSTRACT

A magnetic recording medium having a magnetic layer with a single-layered structure applicable to a linear system is provided. The magnetic recording medium includes an elongated nonmagnetic support and a single-layered magnetic layer having an orthorhombic structure formed on a main surface of the nonmagnetic support by a vacuum thin film deposition technique, and an Hcmax/Hx0 ratio is not greater than 1.2, where Hcmax is a maximum value of a coercive force of the magnetic layer which acts in a plane perpendicular to the magnetic layer and containing a longitudinal direction of the magnetic recording medium, and Hc0 is a coercive force of the magnetic layer which acts in the longitudinal direction of the magnetic recording medium.

7 Claims, 4 Drawing Sheets

MAGNETIC RECORDING MEDIUM

CROSS REFERENCES TO RELATED APPLICATIONS

The present document is based on Japanese Priority Document JP 2003-118535, filed in the Japanese Patent Office on Apr. 23, 2003, the entire contents of which being incorporated herein by reference.

BACKGROUND OF THE INVENTION

1. Field of the Invention

The present invention relates to a high-density magnetic recording medium and, more particularly, to a magnetic recording medium from which signals are reproduced by a magnetic recording tape system of a so-called linear method for recording signals on a magnetic tape by using a magnetoresistive magnetic head (MR head) or a giant magnetoresistive magnetic head (GMR head) while causing the magnetic head to move in opposite directions with respect to a longitudinal direction of the magnetic tape.

2. Description of Related Art

A magnetic recording medium of so-called thin metal film type has recently been applied to magnetic recording media in a field of video tape recorders and the like in order to achieve far higher image quality and far higher recording density. The magnetic recording medium of a metal thin film type has a construction in which a magnetic layer is formed on a nonmagnetic support in such a manner that a magnetic metal material or a magnetic material such as a Co—Ni-based alloy, Co—Cr-based alloy or Co—CoO-based metal oxide is directly deposited on the nonmagnetic support by vacuum thin film deposition techniques.

Furthermore, in order to improve the electromagnetic conversion characteristics of recording medium of the above-mentioned type to obtain a far higher output therefrom, so-called oblique evaporation has been proposed which obliquely evaporates a magnetic layer material to form a magnetic layer of a magnetic recording medium. Magnetic recording media of the type which have magnetic layers formed by this method have been put to practical use as metal evaporated tapes for high-band 8 mm video tape recorders and digital video tape recorders.

Such a magnetic recording medium of the thin metal film type as described above is superior in coercive force and squareness ratio and its magnetic layer can be formed as an extremely thin layer, so that it has superior electromagnetic conversion characteristics in the short wavelength range and extremely small demagnetization of recording and thickness loss during reproduction. In addition, unlike a magnetic recording medium of a so-called coating type in which a magnetic layer is formed on a nonmagnetic support in such a manner that the nonmagnetic support is coated with a magnetic coating material including-magnetic powder dispersed in a binder, in the magnetic recording medium of the thin metal film, a binder which is a nonmagnetic material is not contained in the magnetic layer, whereby the charging density of a ferromagnetic metal material can be increased and high recording density can be advantageously realized.

The magnetic tape of an oblique evaporation type is fabricated by a method which causes, for example, an elongated nonmagnetic support to run in the longitudinal direction and deposits a magnetic material onto, and forms a magnetic layer on, a main surface of the nonmagnetic support which is in a running state, whereby high productivity and superior magnetic characteristics can be ensured.

On the other hand, as a demand for magnetic recording media, such as magnetic tapes, capable of being used as data streamers has become greater, a demand for magnetic recording media of far higher recording density has increased. Furthermore, instead of related art inductive magnetic heads, magnetoresistive magnetic heads (MR heads) or giant magnetoresistive magnetic heads (GMR heads) have been applied to magnetic heads to be used during reproduction of recorded information. These MR heads and GMR heads are advantageous in terms of improvement of recording density because they can detect even a slight amount of magnetic flux leakage from magnetic layers with high sensitivity.

Each of the MR heads and GMR heads has a detection limit at which its sensitivity to magnetic flux leakage is saturated, so that the MR and GMR heads cannot detect magnetic flux leakage greater than their design limitations. Accordingly, it is necessary to optimize their sensitivity to magnetic flux leakage by decreasing the film thickness of magnetic layers of magnetic recording media.

Two kinds of systems for recording and reproducing magnetic tapes used for data streamers, that is to say, a helical scan system and a linear system, are put to practical use. The helical scan system is a system for performing recording and reproduction by causing a magnetic head disposed on a rotary drum to scan a magnetic tape while rotating at high speed.

The helical scan system not only enables precise recording of tracks but also can theoretically be controlled to accurately scan recorded tracks during reproduction. Accordingly, the helical scan system can achieve high recording density in magnetic tape systems. The helical scan system has found wide practical use such as home video recorders, high-band 8 mm video tape recorders, and digital video tape recorders.

By the way, the linear system is a system for providing tracks arranged on a magnetic tape in a width direction thereof and performing recording in its longitudinal direction. The linear system can readily cause a magnetic tape to run at high speed and, at the same time, can increase the transfer rate of recording and reproduction by arranging a large number of magnetic heads in parallel.

The helical scan system that can achieve high recording density is advantageous in magnetic recording tape systems for camcorders, but the linear system has found wide practical use in data storages capable of using magnetic recording tape systems without the need to greatly limit their cubic volumes. In the market as well, tapes such as DLT (digital linear tape) and LTO (linear tape-open) are mainstream products.

As magnetic tape media for data storages using the linear system, only the magnetic tape of the so-called coating type is used, and the magnetic tape medium of the oblique evaporation type has not been used. This is because, in the helical scan system, relative movement between a magnetic head and a magnetic tape takes place in one predetermined direction, but in the linear system, a magnetic tape and a magnetic head relatively move in opposite directions along the longitudinal direction of the tape.

FIG. 4 is a schematic cross-sectional view of a magnetic tape medium obtained by the oblique evaporation. As shown in FIG. 4, a magnetic layer 102 is formed on a nonmagnetic support 101. The magnetic tape medium formed by the oblique evaporation has a structure in which an axis of easy magnetization along which recorded magnetic bits are arranged is formed not to extend in an in-plane direction of the tape but to rise from a plane of the tape.

Accordingly, during recording and reproduction, if a magnetic head moves in a forward direction (in a direction indicated by an arrow A in FIG. 4) in sliding contact with an orthorhombic structure of the obliquely evaporated thin film, good recording and reproduction characteristics can be achieved. However, if the magnetic head slides in a reverse direction (in a direction indicated by an arrow B in FIG. 4) with respect to the orthorhombic structure of the obliquely evaporated thin film, characteristics such as optimum recording current, phase characteristic, CN ratio and output characteristic are inferior compared to a case where the magnetic head slides in the forward direction, so that there is a disadvantage that satisfactory recording and reproduction characteristics cannot be obtained.

Accordingly, magnetic tape media using oblique evaporation have rarely been used in the linear system which performs recording and reproduction in the opposite directions. However, a method of constructing a magnetic layer of an obliquely evaporated tape by forming two layers of obliquely evaporated film having mutually different growth directions has been proposed as a method for solving a problem that recording and reproduction characteristics differ between a case where a magnetic head slides in the forward direction with respect to the orthorhombic structure of an obliquely evaporated film and a case where the magnetic head slides in the reverse direction with respect to the orthorhombic structure of the obliquely evaporated film (refer to Patent Document 1). FIG. 5 is a schematic cross-sectional view of a magnetic tape medium described in Patent Document 1.

As shown in FIG. 5, a magnetic layer 102 is formed on a nonmagnetic support 101, and the magnetic layer 102 has a structure in which a lower ferromagnetic metal thin film 102a and an upper ferromagnetic metal thin film 102b are stacked. The orthorhombic structures of the respective lower and upper ferromagnetic metal thin films 102a and 102b are grown in directions mutually opposite along the longitudinal direction of the nonmagnetic support 101. The orthorhombic structures of the respective lower and upper ferromagnetic metal thin films 102a and 102b are optimized to decrease difference in recording and reproduction characteristics between the forward and reverse directions.

Patent Document 2 also discloses a magnetic recording medium in which two layers of obliquely evaporated film are stacked which respectively have orthorhombic structures whose growth directions are different from each other. According to the magnetic recording medium described in Patent Document 2, the ratio of the minimum value to the maximum value of a coercive force obtained when an applied field angle is varied from 0° to 180° is set to 0.65 or more, thereby improving the recording and reproduction characteristics relative to both directions.

Patent Document 3 discloses a magnetic recording method which enables recording and reproduction based on a linear system by setting a length of a magnetic layer made of a single-layered cobalt-based obliquely evaporated film to not greater than ½ of a recording-head gap length. According to this method, a cobalt-based obliquely evaporated film having a thickness of 40 nm or less and a coercive force of 1,800 Oe is suitably employed.

Patent Document 1 is Japanese Patent Application Laid-Open No. 4-353622.

Patent Document 2 is Japanese Patent Application Laid-Open No. 9-73621.

Patent Document 3 is Japanese Patent Application Laid-Open No. 2000-339605.

Non-Patent Document 1 is Magneto-Resistive Heads and Spin Valve Heads: Fundamentals & Applications, Second Edition, translated by Kazuhiko Hayashi, published by Maruzen CO., LTD. in 2002.

SUMMARY OF THE INVENTION

However, the obliquely evaporated magnetic tape media which are improved in their recording and reproduction characteristics relative to the opposite directions by the techniques described in Patent Documents 1 and 2 have two magnetic layers which differ from each other in their growth directions, so that a magnetic-layer deposition process needs to be performed twice. This leads to cost increases of the magnetic recording media. In the recent tape storage market, it is very important and indispensable to decrease the cost of magnetic recording media, in terms of acquisition of the market.

In Patent Document 1, the total thickness of the magnetic layer is made 160 nm to 200 nm, and in the embodiment of Patent Document 2 as well, since the two magnetic layers each having a thickness of 60 nm are stacked, the total thickness of the magnetic layers is 180 nm. MR heads and GMR heads have high sensitivity, and if the thicknesses of their magnetic layers are set within this range, the heads are saturated and cannot detect magnetic flux leakage. In Patent Document 3, although the thickness of the magnetic layer is defined, the applied field angle dependence of the coercive force and the magnetic anisotropy of the magnetic layer are not particularly mentioned.

The present invention has been made in view of the above-mentioned problems, and provides a magnetic recording medium having a magnetic layer with a single-layered structure applicable to a linear system.

A magnetic recording medium according to an embodiment of the present invention, therefore, includes an elongated nonmagnetic support and a single-layered magnetic layer having an orthorhombic structure formed on a main surface of the nonmagnetic support by a vacuum thin film deposition technique, and an Hcmax/Hc0 ratio is not greater than 1.2, where Hcmax is a maximum value of a coercive force of the magnetic layer which acts in a plane perpendicular to the magnetic layer and containing a longitudinal direction of the magnetic recording medium, and Hc0 is a coercive force of the magnetic layer which acts in the longitudinal direction of the magnetic recording medium.

Accordingly, even in a magnetic recording medium of the type having a single-layered magnetic layer, it is possible to decrease the difference in recording and reproduction characteristics between the opposite directions. In addition, since two magnetic layers need not be stacked, it is possible to reduce the manufacturing cost of the magnetic recording medium and it is also possible to reduce the period of time required for forming the magnetic layer.

BRIEF DESCRIPTION OF THE DRAWINGS

The invention will become more readily appreciated and understood from the following detailed description of a preferred embodiment and examples of the invention when taken in conjunction with the accompanying drawings, in which.

DESCRIPTION OF THE PREFERRED EMBODIMENT

Figure 1:
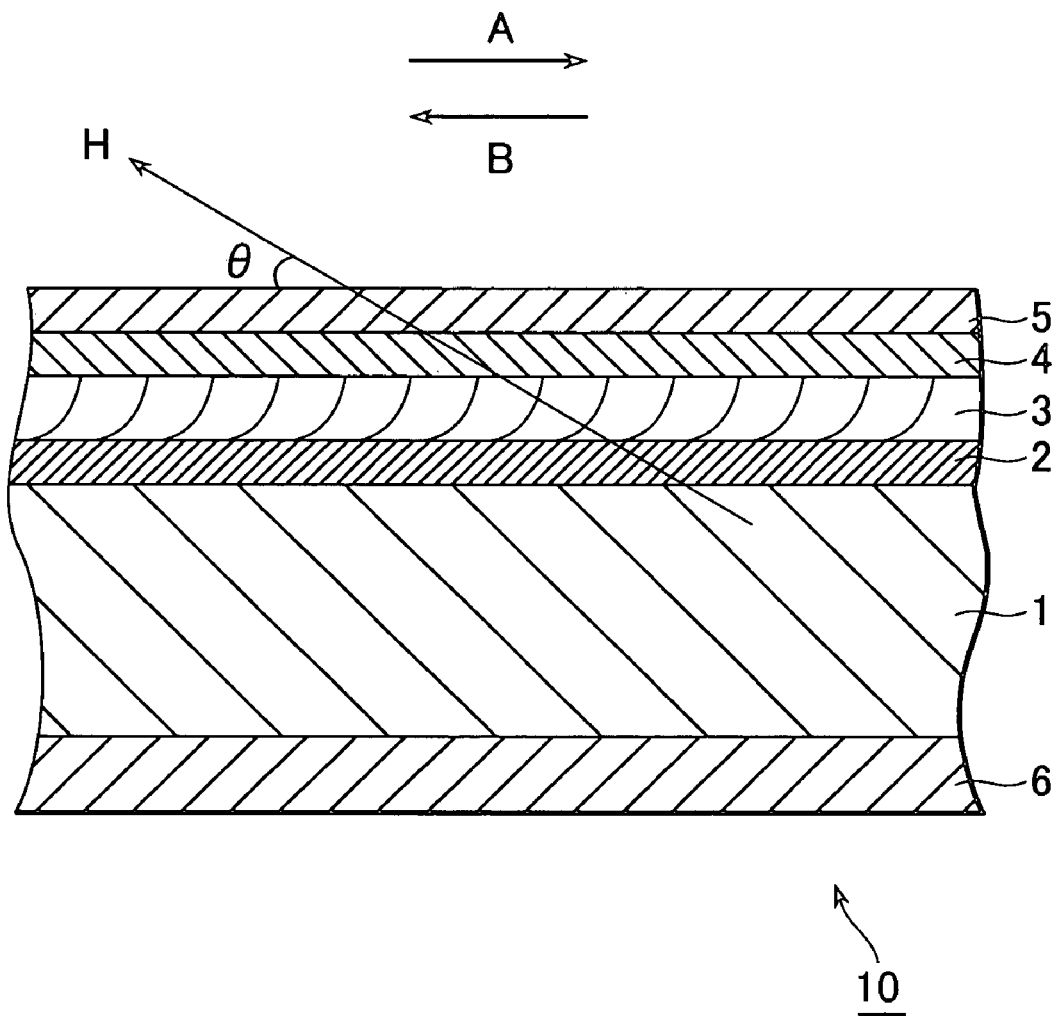
FIG. 1 is a cross-sectional view of a magnetic recording medium according to a preferred embodiment of the present invention.

A preferred embodiment of a magnetic recording medium according to the present invention will be described below in detail with reference to FIGS. 1 to 3. FIG. 1 is a schematic cross-sectional view showing one example of a magnetic recording medium according to a preferred embodiment of the present invention. As shown in FIG. 1, a magnetic recording medium 10 is a metal evaporated tape having a construction in which a base layer 2, a magnetic layer 3 and a protective layer 4 are formed on an elongated nonmagnetic support 1 in a manner of being stacked in named order. A lubricant layer 5 composed of a predetermined lubricant may be formed on the protective layer 4 as required. In addition, a backcoating layer 6 may also be formed on the surface of the nonmagnetic support 1 opposite to the surface on which the magnetic layer 3 is formed.

The magnetic layer 3 of the magnetic recording medium 10 is formed by oblique evaporation, and has an orthorhombic structure. In FIG. 1, each of arrows A and B indicates the longitudinal direction of the magnetic recording medium 10, and the respective arrows A and B indicate mutually opposite directions. As shown in FIG. 1, an application angle θ denotes an angle which is made by the longitudinal direction of the magnetic recording medium 10 and the direction of an applied magnetic field H. A coercive force Hc of the magnetic layer 3 varies depending on the application angle θ in a plane which is perpendicular to the magnetic layer 3 and contains the longitudinal direction of the magnetic recording medium 10, that is to say, in a plane parallel to the sheet surface of FIG. 1.

Symbol Hcmax denotes a maximum value of a coercive force obtained when the application angle θ is varied from 0° to 180°. Symbol Hc0 denotes a coercive force obtained when the application angle θ is 0°, that is to say, a coercive force obtained in the longitudinal direction of the magnetic recording medium 10. In the magnetic recording medium 10 according to the present embodiment, the ratio of the coercive force Hcmax to the coercive force Hc0 (Hcmax/Hc0) is not greater than 1.2.

Accordingly, the difference between a case where recording and reproduction are performed by relatively moving a magnetic head and the magnetic recording medium 10 in the direction of the arrow A and a case where recording and reproduction are performed by relatively moving the magnetic head and the magnetic recording in the direction of the arrow B is accommodated within a range suited to recording and reproduction using a linear system. The ratio Hcmax/Hc0 depends on an amount of oxygen introduced during the deposition of the magnetic layer 3, and an angle of incidence of particles evaporated onto the nonmagnetic support 1, and therefore, these conditions are controlled to optimize the ratio Hcmax/Hc0.

Figure 2:
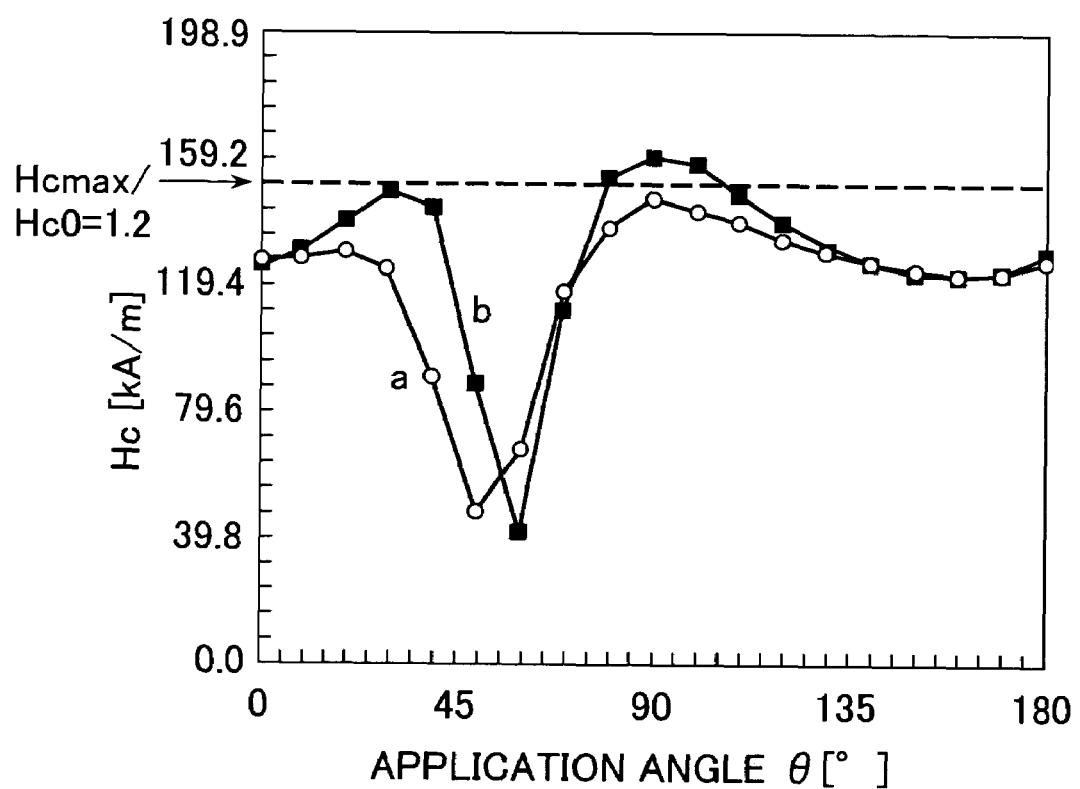
FIG. 2 is a graph showing an applied field angle dependence of a coercive force of a magnetic recording medium according to the preferred embodiment of the present invention.

FIG. 2 is a graph showing the applied field angle dependence of the coercive force of a magnetic recording medium according to the present embodiment. It is known that if a magnetic recording medium has a structure in which its ferromagnetic particles are oriented at a particular angle to some extent, as in the case of metal evaporated tape, the coercive force of the magnetic recording medium which makes an angle of 90° with its axis of easy magnetization takes on a minimal value. In FIG. 2, a minimal point lying in a range of θ between approximately 50° to 70° corresponds to the minimal value. On the other hand, at maximal points respectively occurring on both sides of this minimal point (in FIG. 2, near θ=30° and near θ=90°), the interaction of magnetic particles in the direction of easy magnetization becomes large.

As the maximum value Hcmax of the coercive force becomes large with respect to the coercive force Hc0 at θ=0°, the magnetic anisotropy of the obliquely evaporated tape in an oblique direction thereof (in a direction between the direction normal to its magnetic layer and the in-plane direction thereof) becomes large. In FIG. 2, magnetic recording media a and b differ from each other in deposition conditions for their magnetic layers, and the maximum value Hcmax of the coercive force of the magnetic recording medium b is larger than that of the magnetic recording medium a. In the magnetic recording medium a of FIG. 2, the ratio Hcmax/Hc0 of the maximum value Hcmax of the coercive force to the coercive force Hc0 at the application angle θ=0° is smaller than 1.2, whereas in the magnetic recording medium b of FIG. 2, the ratio Hcmax/Hc0 exceeds 1.2. Both magnetic recording media a and b have magnetic anisotropy in their oblique directions, but the magnetic anisotropy is smaller in the magnetic layer of the magnetic recording medium a than in the magnetic layer of the magnetic recording medium b.

In general, as the magnetic anisotropy of a magnetic layer in an oblique direction thereof becomes larger, the output difference of the magnetic layer becomes larger when the magnetic layer are recorded and reproduced in its forward and reverse directions. As to the magnetic recording media a and b, the magnetic recording medium a is smaller in output difference than the magnetic recording medium b. As described above, if a metal evaporated tape having a single-layered magnetic layer is used for recording and reproduction based on a linear system, there arises a problem of the difference in the recording and reproduction characteristics of the tape between the forward and reverse directions. However, by accommodating the ratio Hcmax/Hc0 of the magnetic layer within the above-mentioned range, it is possible to decrease the difference in the recording and reproduction characteristics of the tape between the forward and reverse directions, whereby it is possible to obtain the necessary reproduction output from the tape. Accordingly, it is possible to realize high-density recording in magnetic recording and reproduction systems using various linear systems, such as tape streamers, by applying the magnetic recording medium according to the present invention to the systems.

The individual layers which constitute the magnetic recording medium 10 according to the embodiment shown in FIG. 1 will be described below in detail. Any kind of known material used in related art magnetic tapes can be applied to the nonmagnetic support 1. For example, it is possible to use polyesters such as polyethylene terephthalate (PET) and polyethylene naphthalate (PEN), polyolefins such as polyethylene and polypropylene, cellulose derivatives such as cellulose triacetate, and plastics such as polycarbonate, polyimide, polyamide and polyamide imide.

The base layer 2 is provided as required in order to improve the durability and runnability of the magnetic recording medium 10 obtained finally, as well as the handling ability of magnetic tape during deposition thereof. For example, the base layer 2 may be formed from a coating material containing a binder resin, a filler, a surface active agent and the like, to add fine unevenness to the surface of the base layer 2 or to increase the mechanical strength thereof.

The binder resin which forms the base layer 2 is selected from among, for example, aqueous polyester resins, aqueous acrylic resins and aqueous polyurethane resins. The filler is selected from among grains made of organic polymers, grains of silicon dioxide, grains of calcium carbonate, and the like. It is preferable that a mean particle size of the filler is made, for example, 5-30 nm and the density of surface projections be made, for example, 500,000 to 30,000,000 projections/mm$^2$.

The mean particle size of the filler which constitutes the base layer 2 and the density of the surface projections formed by the filler can be appropriately set within a range in which the magnetic recording medium 10 obtained finally does not lose good running durability nor good electromagnetic conversion characteristics. Otherwise, unevenness may be artificially formed on the nonmagnetic support 1 by lithography techniques, or fine projections made of a metal, an inorganic compound or an organic polymer may also be formed by plating or by vacuum thin film deposition techniques.

The magnetic layer 3 is formed by a vacuum evaporation method which thermally evaporates and deposits a ferromagnetic metal material under vacuum. A manufacturing process which causes the elongated nonmagnetic support 1 to run in a longitudinal direction and deposits magnetic particles onto, and forms a magnetic layer on, a main surface of the running nonmagnetic support 1 has advantages such as good deposition performance, high productivity and ease of operation.

Figure 3:
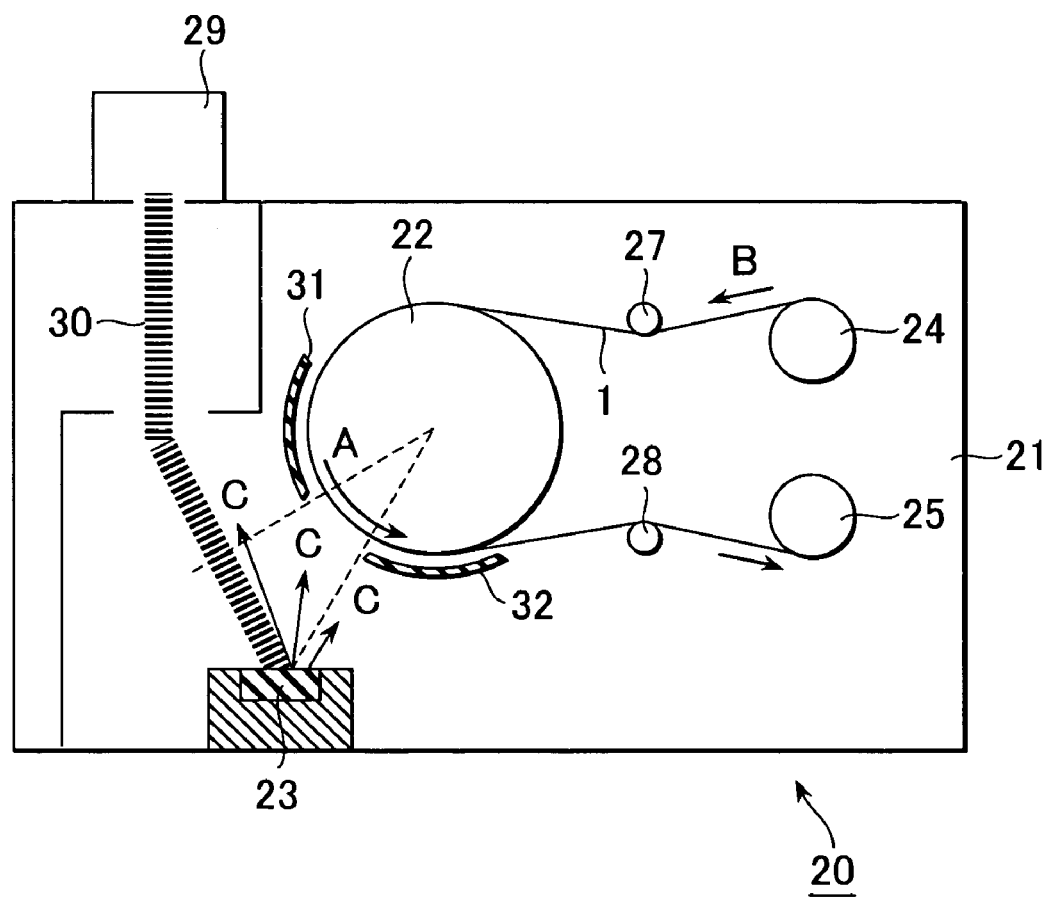
FIG. 3 is a schematic view showing a vacuum evaporation system for forming a magnetic layer of the magnetic recording medium according to the preferred embodiment of the present invention.
Figure 4:
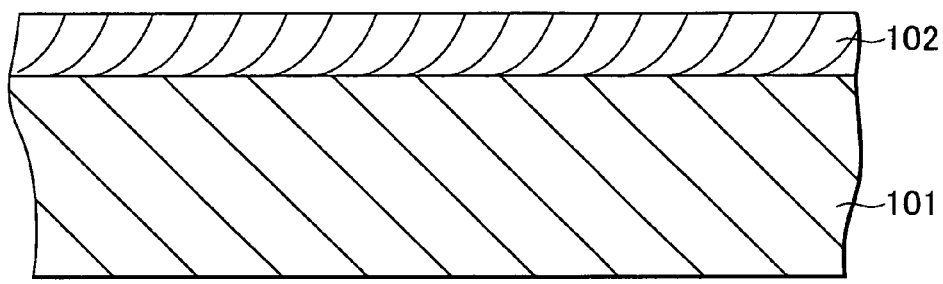
FIG. 4 is a cross-sectional view showing a related art magnetic recording medium.
Figure 5:
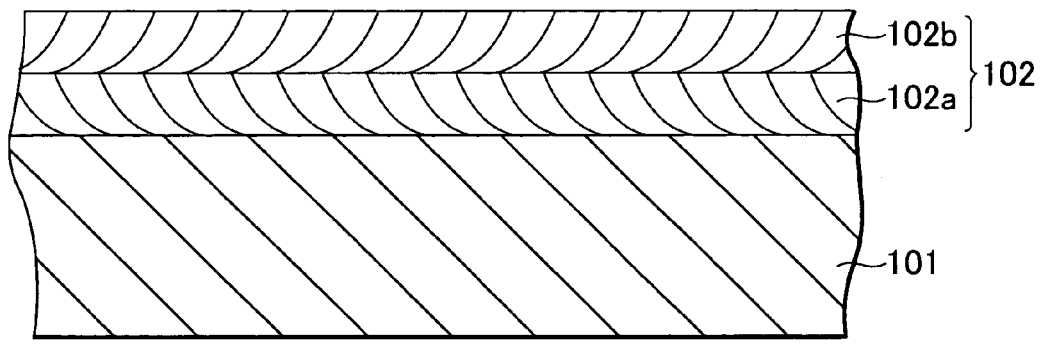
FIG. 5 is a cross-sectional view showing a related art magnetic recording medium.

A vacuum evaporation apparatus 20 of the continuous winding type shown in FIG. 3 can be used as a vacuum evaporation apparatus for forming the magnetic layer 3. A vacuum chamber 21 of the vacuum evaporation apparatus 20 is constructed for oblique evaporation, and its inside is evacuated to a pressure of approximately $1 \times 10^{-3}$ Pa. A cooling can 22 and an evaporation source 23 are disposed in the vacuum chamber 21. The cooling can 22 is cooled at, for example, approximately $-20°$ C., and rotates in the direction indicated by an arrow A in FIG. 3. The evaporation source 23 is disposed to oppose the cooling can 22.

A feed roll 24 and a take-up roll 25 are arranged in the vacuum chamber 21. The nonmagnetic support 1 on which the base layer 2 (refer to FIG. 1) is formed is fed from the feed roll 24 in the direction indicated by an arrow B in FIG. 3, and is wound around after having run along the periphery of the cooling can 22.

It is to be noted that guide rollers 27 and 28 are respectively disposed between the feed roll 24 and the cooling can 22 and between the cooling can 22 and the take-up roll 25. The guide roller 27 adjusts the tension of the nonmagnetic support 1 which runs from the feed roll 24 toward the cooling can 22. The guide roller 28 adjusts the tension of the nonmagnetic support 1 which runs from the cooling can 22 toward the take-up roll 25. This construction enables the nonmagnetic support 1 to run smoothly.

The evaporation source 23 has a construction in which a ferromagnetic metal material such as Co is accommodated in a container such as a crucible, and the vacuum evaporation system 20 is provided with an electron beam generation source 29 for heating and evaporating the ferromagnetic metal material of the evaporation source 23. When an electron beam 30 generated from the electron beam generation source 29 is accelerated and irradiated onto the ferromagnetic metal material of the evaporation source 23, the ferromagnetic metal material of the evaporation source 23 evaporates as shown by arrows C in FIG. 3. The ferromagnetic metal material is deposited onto the nonmagnetic support 1 which is running along the periphery of the cooling can 22 opposed to the evaporation source 23.

A first shutter 31 and a second shutter 32 are provided between the evaporation source 23 and the cooling can 22. The first shutter 31 is located on the upstream side of the running nonmagnetic support 1, while the second shutter 32 is located on the downstream side of the running nonmagnetic support 1. The first shutter 31 and the second shutter 32 allow only a predetermined area of the nonmagnetic support 1 which is running along the periphery of the cooling can 22 to be exposed to the outside (the atmosphere in which the ferromagnetic metal material is evaporated). Namely, the first shutter 31 and the second shutter 32 restrict the angle of injection of a gas of the ferromagnetic metal material with respect to the nonmagnetic support 1.

During the evaporation of the ferromagnetic metal material, an oxygen gas is supplied through an oxygen gas introduction port (not shown) to the portion of the nonmagnetic support 1 that is near the surface thereof and onto which the ferromagnetic metal material is to be injected. This arrangement introduces oxygen to the magnetic layer to be formed. By optimizing the quantity of oxygen to be introduced, it is possible to restrain the magnetic anisotropy of obliquely evaporated tapes, whereby it is possible to obtain metal evaporated tapes suited to recording and reproduction based on linear systems.

In addition, by appropriately controlling the oxidation of the magnetic layer, it is possible to improve the durability and weather resistance of the ferromagnetic metal material. In addition to the above-mentioned type of heating means using electron beams, various known means such as resistance heating means, high-frequency heating means and laser heating means can be used for the heating of the evaporation source.

In the vacuum evaporation apparatus 20 having the above-mentioned construction, while the ferromagnetic metal material is being evaporated from the evaporation source 23, the nonmagnetic support 1 is made to run along the periphery of the cooling can 22. The evaporated ferromagnetic metal material is deposited onto only the portion of the nonmagnetic support 1 that is exposed to the outside from between the first shutter 31 and the second shutter 32.

Since the vacuum evaporation apparatus 20 causes the nonmagnetic support 1 to run from the side on which the first shutter 31 is located toward the side on which the second shutter 32 is located, the evaporated ferromagnetic metal material is first deposited onto the nonmagnetic support 1 on the side of the first shutter 31. Then, as the nonmagnetic support 1 moves from the side of the first shutter 31 toward the side of the second shutter 32, the evaporated ferromagnetic metal material is sequentially deposited on the nonmagnetic support 1. Accordingly, magnetic layers formed with restricted injection angles of ferromagnetic particles by the above-mentioned deposition method have the characteristic of having orthorhombic structures. Since the oblique magnetic anisotropy of the magnetic layers varies with the injection angle of magnetic particles, the quantity of oxygen to be introduced and the injection angle of magnetic particles during deposition are desirably optimized according to system constructions and the kinds of magnetic materials used.

The magnetic recording medium according to the present invention is applied to a recording and reproduction apparatus having an MR head or a GMR head, and the magnetic layer 3 is desirably formed as an extremely thin layer in order to realize a far greater reduction in noise and a far greater improvement in C/N ratio. Accordingly, the film thickness of the magnetic layer 3 is desirably made 40-100 nm.

If the film thickness of the magnetic layer 3 is made less than 40 nm, the magnetic layer 3 becomes extremely thin, so that its crystal growth is degraded and magnetic characteristics sufficient to produce high C/N ratios cannot be obtained. On the other hand, if the magnetic layer 3 is formed with a film thickness of greater than 100 nm, the saturation phenomenon of magnetic heads becomes remarkable, so that there are cases where the desired recording density cannot be achieved when an MR head or a GMR head is applied to the magnetic recording medium according to the present embodiment.

As the ferromagnetic metal material which forms the magnetic layer 3, it is possible to use any of known metal materials and magnetic alloys which have generally been used for fabricating this kind of magnetic recording medium. General examples are materials such as ferromagnetic metals (such as Co and Ni), Co—Ni-based alloys, Co—Fe-based alloys, Co—Ni—Fe-based alloys, Co—Cr-based alloys, Co—Pt-based alloys, Co—Pt—B-based alloys, Co—Cr—Ta-based alloys and Co—Cr—Pt—Ta-based alloys, or an oxygen-containing film obtained by depositing any of these materials in an oxygen atmosphere, or a material containing any of these materials and at least one different kind of element.

In the magnetic recording medium 10 according to the present embodiment, in addition to the base layer 2, an intermediate layer (not shown) may also be formed between the magnetic layer 3 and the nonmagnetic support 1 by means of vacuum thin film deposition techniques for the purposes of achieving refinement of the crystal grains of the magnetic layer 3 as well as improvement of the orientation of the crystal grains.

Examples of the vacuum thin film deposition techniques are so-called physical vapor deposition (PVD) methods such as a vacuum evaporation method which thermally evaporates a predetermined material under vacuum and deposits the evaporated material onto a body to be processed, an ion plating method which carries out evaporation of a predetermined material during electric discharge, and a sputtering method which causes a glow discharge in an atmosphere mainly containing argon and sputters surface atoms from the target by means of generated argon ions.

Examples of a material which constitutes the intermediate layer are metal materials such as Co, Cu, Ni, Fe, Zr, Pt, Au, Ta, W, Ag, Al, Mn, Cr, Ti, V, Nb, Mo and Ru, alloys any of which includes a combination of at least two arbitrary kinds selected from among these metal materials, compounds of any of these metal materials and oxygen or nitrogen, compounds such as silicon oxide, silicon nitride, ITO (indium tin oxide), $In_2O_3$ and ZrO, carbon, and diamond-like carbon (DLC).

The protective layer 4 made of DLC is desirably formed on the magnetic layer 3 in order to ensure good running durability and corrosion resistance. The protective layer 4 can be formed by a CVD method using, for example, a plasma CVD (Chemical Vapor Deposition) continuous film forming apparatus.

As the CVD method, it is possible to use any of known methods such as a mesh electrode DC plasma method, an electron beam excited plasma source method, a cold cathode ion source method, an ionized deposition method and a catalyst CVD method. As a carbon compound for the CVD method, it is possible to use any of known materials such as hydrocarbon-based, keton-based and alcohol-based compounds. In addition, during the formation of plasma, a gas such as Ar or $H_2$ may also be introduced as a gas for promoting differentiation of the carbon compound.

For the purpose of improving the runnability of the magnetic recording medium 10, the lubricant layer 5 may be formed on the protective layer 4 by coating an arbitrary lubricant such as a perfluoropolyether-based lubricant onto the protective layer 4.

The backcoating layer 6 is formed on the surface of the nonmagnetic support 1 opposite to the surface on which the magnetic layer 3 is formed, for the purposes of achieving improvement of the runnability of the magnetic recording medium 10 and prevention of the accumulation of static electricity.

The film thickness of the backcoating layer 6 is suitably approximately 0.2-0.7 µm. The backcoating layer 6 is formed, for example, by dispersing solid particles such as an inorganic pigment in a binder, kneading the binder together with an organic solvent corresponding to the kind of binder to prepare a backcoating material, and coating this backcoating material onto the reverse side of the nonmagnetic support 1.

The magnetic recording medium 10 according to the present embodiment, which is fabricated in the above-mentioned manner, is suitable for magnetic recording media for magnetic recording tape systems based on linear systems using MR heads. The term "MR head" used herein represents a magnetic head for reproduction only which detects a signal from a magnetic recording medium by using a magnetoresistance effect. In general, MR heads are suitable for magnetic recording media for high-density recording because MR heads are higher in sensitivity and larger in reproduction output than inductive magnetic heads which perform recording and reproduction by using electromagnetic induction.

An MR head is provided with an approximately rectangular MR element unit clamped between a pair of magnetic shields made of a soft magnetic material such as Ni—Zn polycrystalline ferrite with an insulator interposed between the MR element unit and each of the magnetic shields. A pair of terminals are respectively extended from both ends of the MR element unit so that a sense current can be supplied to the MR element unit via these terminals.

When a signal is to be reproduced from a magnetic recording medium by means of the MR head, the MR element unit is made to move in sliding contact with the magnetic recording medium. During this state, a sense current is supplied to the MR element unit via the terminals connected to both ends of the MR element unit, and a voltage variation of this sense current is detected.

When the sense current is supplied to the MR element unit with the MR element unit moved in sliding contact with the magnetic recording medium, the magnetization direction of the MR element unit varies according to a magnetic field applied from the magnetic recording medium, and the relative angle between the sense current supplied to the MR element unit and the magnetization direction varies. Then, the resistance value of the MR element unit varies depending on a relative angle made by the magnetization direction of the MR element unit and the direction of the sense current.

Accordingly, a voltage variation occurs in the sense current by keeping constant the value of the sense current supplied to the MR element unit. By detecting the voltage variation in the sense current, it is possible to detect a signal magnetic field generated from the magnetic recording medium, whereby it is possible to reproduce a signal recorded on the magnetic recording medium. Incidentally, a so-called giant magnetoresistive magnetic head (GMR head) can be applied as a reproducing magnetic head.

As a method of applying a bias magnetic field to the MR element part, it is possible to use various techniques such as an SAL (soft adjacent layer) bias method, a permanent magnet bias method, a shunt current bias method, a self-bias method, an exchange bias method, a barber pole method, a divided-element method and a servo-bias method. Details of giant magnetoresistive devices and various bias methods are described in, for example, Non-Patent Document 1.

Specific examples of the magnetic recording medium according to the present invention will be described below with reference to experimental results.

EXAMPLE 1

A polyethylene terephthalate film of thickness 8.0 µm and width 150 mm was prepared as the nonmagnetic support 1.

The base layer 2 of thickness 5 nm was formed on the side on the nonmagnetic support 1 where the magnetic layer 3 was to be formed. The base layer 2 was formed by coating a surface of the nonmagnetic support 1 with a coating material obtained by dispersing silica particles in an aqueous latex mainly containing an acrylic ester. Silica particles of size 10 nm were employed, and were dispersed so that the density of silica particles became $1 \times 10^7$ particles/mm$^2$ on the nonmagnetic support 1.

Then, the magnetic layer 3 was formed by using the vacuum evaporation system 20 shown in FIG. 3. Co was used as a metal magnetic material which served as an evaporation source material. Oxygen was introduced through the oxygen gas introduction port at an introduction rate of $7.0 \times 10^{-4}$ m$^3$/min, and the metal magnetic material was heated by irradiation with the electron beam 30 from the electron beam generation source 29, whereby a Co—CoO-based magnetic layer was formed by reactive vacuum evaporation. The magnetic layer 3 was formed to a film thickness of 60 nm. During this time, the minimum injection angle and the maximum injection angle of the evaporated Co particles were respectively adjusted to 45° and 70° by means of the first shutter 31 and the second shutter 32.

Then, the protective layer 4 made of a DLC film was formed to a thickness of 10 nm on the magnetic layer 3 formed in the above-mentioned manner, by means of a plasma CVD method. Further, the lubricant layer 5 of thickness 2 nm was formed on the protective layer 4 by coating the protective layer 4 with a perfluoropolyether-based lubricant.

In addition, a backcoating material containing carbon particles and an urethane resin was coated onto the surface of the nonmagnetic support 1 opposite to the surface on which the magnetic layer 3 was formed, whereby the backcoating layer 6 of thickness 0.5 µm was formed on the surface of the nonmagnetic support 1. Carbon particles having a mean particle size of 20 nm were employed. A coating apparatus based on a direct gravure method was employed for coating the backcoating material. After a raw product for the objective magnetic recording medium 10 had been obtained through the above-mentioned process, the raw product was cut to a width of ½ inch, whereby a sample magnetic tape was obtained.

EXAMPLE 2

A sample was fabricated in a similar manner to Example 1 except that an introduction rate of oxygen during the formation of the magnetic layer 3 was set to $8.0 \times 10^{-4}$ m$^3$/min.

COMPARATIVE EXAMPLE 1

A sample was fabricated in the similar manner to Example 1 except that the introduction rate of oxygen during the formation of the magnetic layer 3 was set to $5.0 \times 10^{-4}$ m$^3$/min.

COMPARATIVE EXAMPLE 2

A sample was fabricated in the similar manner to Example 1 except that the introduction rate of oxygen during the formation of the magnetic layer 3 was set to $9.0 \times 10^{-4}$ m$^3$/min.

The electromagnetic conversion characteristics and the magnetic characteristics of each of the sample magnetic tapes fabricated in the above-mentioned manner were evaluated by means of a method which will be described below. A drum tester was used for evaluating the electromagnetic conversion characteristics. An MIG head of gap length 0.22 µm and track width 20 µm was used as a recording head. For the evaluation of the electromagnetic conversion characteristics, recording was performed with recording wavelengths of 0.6 µm and 0.3 µm by means of the MIG head, and the carrier outputs obtained when reproduction was performed by means of an NiFe MR head of track width 5 µm were measured.

Each of the samples was measured in such a way that the magnetic tape and the magnetic head were operated to relatively move in both forward and reverse directions. The recording current of the recording head was set to a value which enabled a maximum reproduction output to be obtained when each of the samples was measured in the forward direction, and the recording current of the recording head for measurement in the reverse direction was also fixed to the same recording current. A reference level (0 dB) for the signal output difference between the recording wavelengths of 0.6 µm and 0.3 µm during the forward recording and reproduction was set to (output relative to recording wavelength of 0.3 µm)—(output relative to recording wavelength of 0.6 µm) obtained in Example 1. As to each of the samples, when the result of (output relative to recording wavelength of 0.3 µm)—(output relative to recording wavelength of 0.6 µm) was minus with respect to Example 1 (the reference level), the extent of output degradation relative to short wavelengths was large compared to Example 1.

Incidentally, the relative speed between the magnetic tape and the MR head was set to 7 m/sec. The magnetic characteristics were measured by means of a vibrating sample magnetometer (VSM). The applied field angle dependence of the coercive force of each of the samples was measured by measuring hysteresis loops at individual rotational angles while rotating the sample during the application of an external magnetic field thereto. The evaluation results of Examples 1 and 2 as well as those of Comparative Examples 1 and 2 are shown in Table 1.

TABLE 1

| | Hc0 [kA/m] | Hcmax [kA/m] | Hcmax/Hc0 | Reproduced signal output difference in recording and reproduction between forward and reverse directions in the case of 0.3 µm recording and reproduction wavelength | Signal output difference between 0.3 µm recording wavelength and 0.6 µm recording wavelength during forward recording and reproduction |
|---|---|---|---|---|---|
| Example 1 | 134.6 | 158.0 | 1.17 | 2.9 dB | reference |
| Example 2 | 126.5 | 145.9 | 1.15 | 2.6 dB | −0.4 dB |
| Comparative example 1 | 124.6 | 159.4 | 1.28 | 4.2 dB | +0.5 dB |
| Comparative example 2 | 94.5 | 106.9 | 1.13 | 2.3 dB | −1.5 dB |

As shown in Table 1, each of the magnetic tapes of Examples 1 and 2 is 1.2 or less in Hcmax/Hc0 and the magnetic anisotropy of obliquely evaporated tape is weak, so that the output difference between the forward and the reverse directions is as small as 3 dB or less. Even in the case of an evaporated tape having a single-layered magnetic layer, as long as the output difference is not greater than 3 dB, recording and reproduction using a linear system can be put to-practical use. Incidentally, the coercive force Hc0 of each of Examples 1 and 2 was not less than 100 kA/m.

On the other hand, the magnetic tape of Comparative Example 1 showed strong anisotropy and a large output difference between the forward and reverse directions, and was not able to gain characteristics suitable for recording media for linear methods.

The magnetic tape of Comparative Example 2 showed weak anisotropy, but the coercive force Hc0 was low and the output decrease relative to the range of short wavelengths was large. Accordingly, the magnetic tape of Comparative Example 2 is not suitable for magnetic recording media for high-density recording.

As described hereinabove, according to the magnetic tape according to the embodiment of the present invention, since the magnetic anisotropy of obliquely evaporated magnetic tape is weakened so that the ratio Hcmax/Hc0 becomes not greater than 1.2, the difference in recording and reproduction characteristics between the forward and reverse directions is reduced.

Accordingly, the magnetic tape according to the present embodiment makes it possible to realize high-density recording and reproduction with low-cost single-layered metal evaporated tapes in magnetic recording and reproduction systems based on linear systems using high-sensitivity magnetic heads such as MR heads. The magnetic recording medium according to present invention is not limited to any of the above-mentioned embodiment and examples. Various modifications can be made without departing from the scope and spirit of the present invention.

What is claimed is:

1. A magnetic recording medium comprising:
   an elongated nonmagnetic support; and
   a single-layered magnetic layer having an orthorhombic structure formed on a main surface of said nonmagnetic support by a vacuum thin film deposition technique, wherein,
   said single-layered magnetic layer has a thickness from 40 nm to 100 nm,
   an Hcmax/Hx0 ratio of said magnetic layer is not greater than 1.2, where Hcmax is a maximum value of a coercive force of said magnetic layer which acts in a plane perpendicular to said magnetic layer and containing a longitudinal direction of said magnetic recording medium, and Hc0 is a coercive force of said magnetic layer which acts in the longitudinal direction of the magnetic recording medium, and
   said magnetic recording medium is specially adapted for recording and reproduction using a magnetoresistive magnetic transducing head or a giant magnetoresistive magnetic transducing head.

2. A magnetic recording medium according to claim 1, wherein said coercive force Hc0 is not less than 100 kA/m.

3. A magnetic recording medium according to claim 1, wherein Mr·δ, which is a product of a remanent magnetization Mr and a film thickness δ, of said single-layered magnetic layer, is within a range expressed by Expression (1), and a signal recorded in said single-layered magnetic layer is reproduced by slide-contact movement of a magnetoresistive magnetic head with respect to said magnetic recording medium:

$$12(mA) \leq Mr \cdot \delta < 30(mA). \quad (1)$$

4. A magnetic recording medium according to claim 1, wherein Mr·δ, which is a product of a remanent magnetization Mr and a film thickness δ of said single-layered magnetic layer, is within a range expressed by Expression (2), and a signal recorded in said single-layered magnetic layer is reproduced by slide-contact movement of a giant magnetoresistive magnetic head with respect to said magnetic recording medium:

$$3(mA) \leq Mr \cdot \delta < 12(mA). \quad (2)$$

5. A magnetic recording medium according to claim 1, comprising a longitudinal direction and a plurality of tracks arranged in parallel with one another in the longitudinal direction so that recording and reproduction of signals can be performed by a linear system.

6. A magnetic recording medium according to claim 1, further comprising a protective layer formed on said single-layered magnetic layer.

7. A magnetic recording medium according to claim 6, wherein said protective layer includes a diamond-like carbon (DLC).

* * * * *